United States Patent [19]

Rivera

[11] Patent Number: 4,686,865
[45] Date of Patent: Aug. 18, 1987

[54] PUSH BUTTON SHIFT CONTROL FOR BICYCLES AND THE LIKE

[76] Inventor: Efrain Rivera, 58 E. 208th St., Bronx, N.Y. 10467

[21] Appl. No.: 920,980

[22] Filed: Oct. 20, 1986

[51] Int. Cl.⁴ .......................... G05G 1/02; G05G 5/08; G05G 11/00
[52] U.S. Cl. ................................ 74/475; 74/483 PB; 74/489; 74/502
[58] Field of Search ................... 74/475, 489, 483 PB, 74/502; 200/5 C, 5 E

[56] References Cited

U.S. PATENT DOCUMENTS

| | | | |
|---|---|---|---|
| 2,442,766 | 6/1948 | Garvin | 200/5 E |
| 2,862,401 | 12/1958 | Gwin, Jr. | 74/483 PB X |
| 4,263,818 | 4/1981 | Ozaki | 74/475 |
| 4,325,267 | 4/1982 | Kojima | 74/475 X |
| 4,548,092 | 10/1985 | Strong, Jr. | 74/475 |

Primary Examiner—Allan D. Herrmann
Attorney, Agent, or Firm—Richard L. Miller

[57] ABSTRACT

A push button shift control for a bicycle and the like is provided and consists of a plurality of push buttons extending upwardly through top of a housing to be clamped typically onto a downtube of the bicycle. A locking mechanism keeps each of the push buttons in a down position when each of the push buttons is pushed in sequence to move a control cable a predetermined distance to operate gears of the bicycle. A releasing mechanism releases the push buttons so that the push buttons and the control cable can return to their previous positions.

8 Claims, 6 Drawing Figures

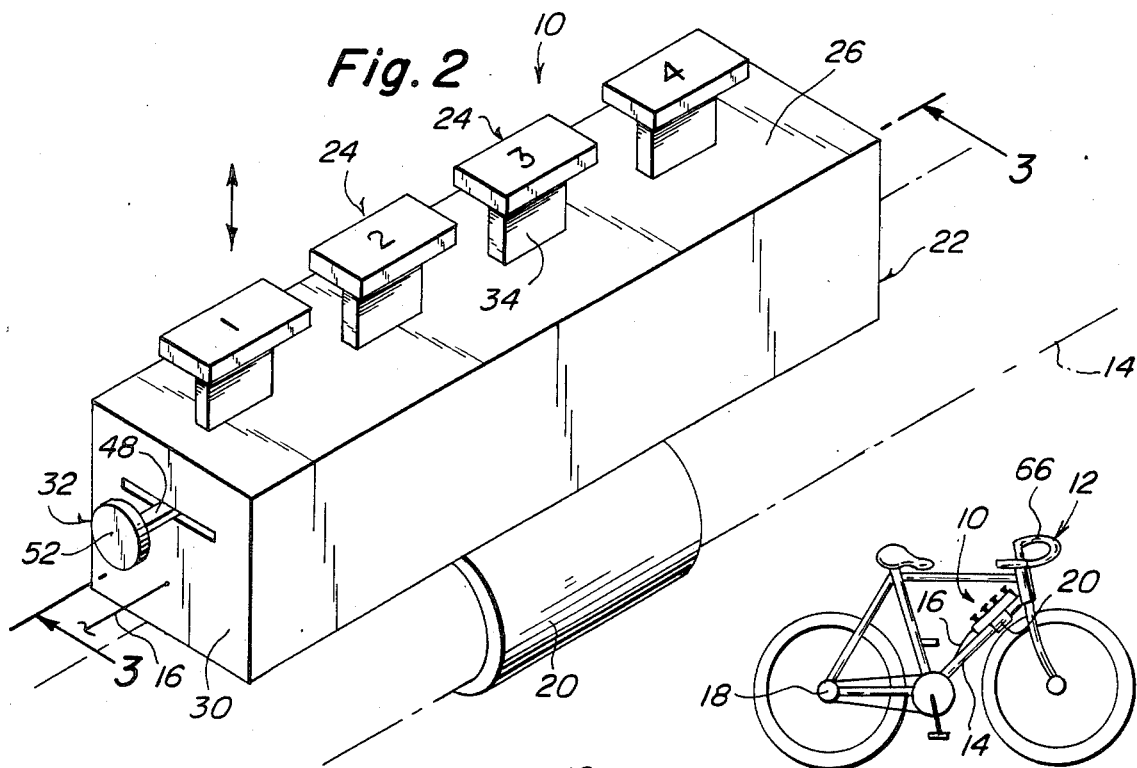
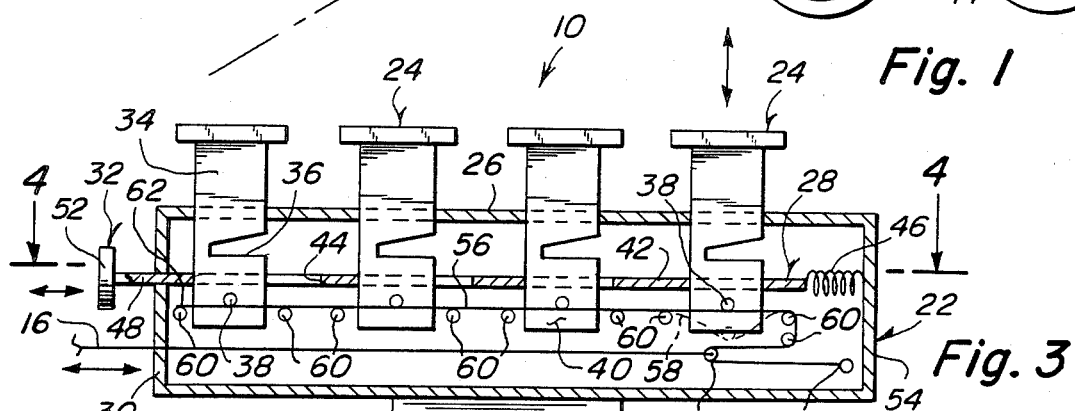
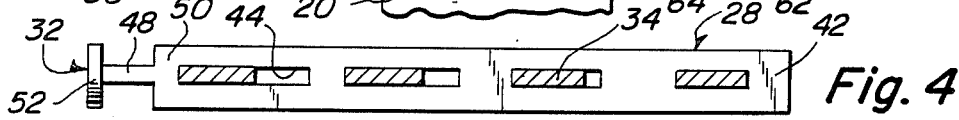
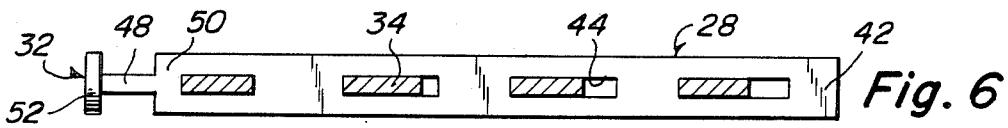
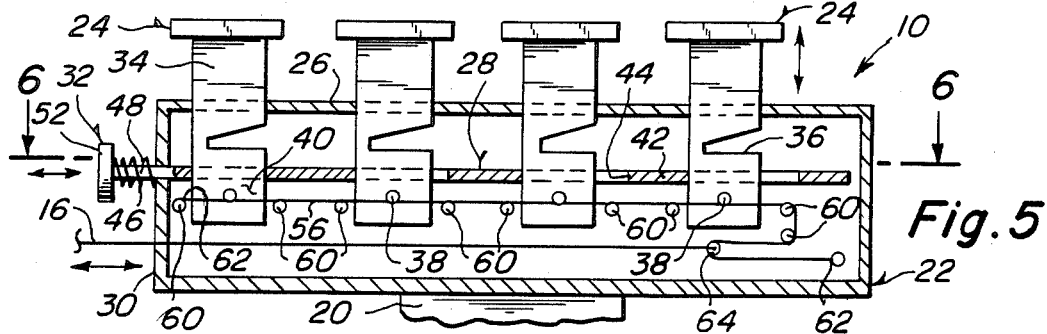

PUSH BUTTON SHIFT CONTROL FOR BICYCLES AND THE LIKE

BACKGROUND OF THE INVENTION

The instant invention relates generally to shift lever devices and more specifically it relates to a push button shift control for a bicycle and the like.

Numerous shift lever devices have been provided in the prior art that are adapted to be mounted on handle bars and operated therefrom. For example, U.S. Pat. Nos. 4,263,818; 4,325,267 and 4,548,092 all are illustrative of such prior art. While these units may be suitable for the particular purpose to which they address, they would not be as suitable for the purpose of the present invention as hereafter described.

SUMMARY OF THE INVENTION

A primary object of the present invention is to provide a push button shift control for a bicycle and the like that will overcome the shortcomings of the prior art devices.

Another object is to provide a push button shift control for a bicycle and the like which contains a plurality of push buttons to move a control cable to operate gears in the bicycle.

An additional object is to provide a push button shift control for a bicycle and the like that is relatively compact in construction and very efficient to use.

A further object is to provide a push button shift control for a bicycle and the like that is simple and easy to use.

A still further object is to provide a push button shift control for a bicycle and the like that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a side view of a bicycle illustrating the invention installed thereon.

FIG. 2 is a perspective view of the instant invention per se.

FIG. 3 is a cross sectional view taken along line 3—3 in FIG. 1 showing the internal mechanism.

FIG. 4 is a cross sectional view taken along line 4—4 in FIG. 3.

FIG. 5 is a cross sectional view similar to FIG. 3 of a modified form of the invention.

FIG. 6 is a cross sectional view taken along line 6—6 in FIG. 5

DETAILED DESCRIPTION OF THE PREFERRED EMBODIMENTS

Turning now descriptively to the drawings, in which like reference characters denote like elements throughout the several views, FIGS. 1 through 6 illustrate a shift control device 10 for a bicycle 12 having a downtube 14, a control cable 16 and gears 18. The device 10 includes a clamp member 20 attached to the downtube 14 and a housing 22 mounted onto the clamp member 20. Although the instant invention is illustrated attached to the downtube 14 this is a matter of choice and the instant invention 10 might be mounted on the handle bars 66 or any other desirable location that the user might prefer. A plurality of push buttons 24 extends upwardly through top 26 of the housing 22. A mechanism 28 is for locking each of the push buttons 24 in a down position when each of the push buttons is depressed in sequence to move the control cable 16, extending outwardly through side 30 of the housing 22, a predetermined distance back into the housing to operate the gears 18. Another mechanism 32 is provided for releasing the push buttons 24 so that the push buttons and the control cable 16 can return to their previous positions.

Each of the push buttons 24 includes a flat plunger 34 having a side wedge shaped notch 36 therein and a pin 38 extending outwardly from side 40 of the plunger 34 below the notch 36 to engage with the control cable 16.

The locking mechanism 28 includes a plate 42 having a plurality of slots 44 therethrough in different lengths so that each of the plungers 34 of the push buttons 24 can extend through each of the slots 44. First of the slots 44 on the left side of FIG. 4 or the right side of FIG. 6, being the longest in length and last of the slots on the right side of FIG. 4 or the left side in FIG. 6 being the shortest in length. A spring 46 is for biasing the plate 42 to move to one side so that each of the slots 44 will enter each of the notches 36 in each of the push buttons when depressed in a proper sequence.

The releasing mechanism 32 includes a shaft 48 extending from one end 50 of the plate 42 and outwardly from side 30 of the housing 22 oppositely from the notches 36 in the push buttons 24. A release button 52 is affixed to free end of the shaft 48 to be depressed to overcome the spring 46 so that the plate 42 will move to the opposite side allowing the slots 44 to leave the notches 36 in the plungers 34 of push buttons 24.

In FIGS. 3 and 4 the longest slot 44 in the plate 42 is on the left and the shortest slot in the plate is on the right so that the push button 24 on the right must be depressed first in sequence to operate the control device 10. In FIGS. 5 and 6 the longest slot 44 in the plate 42 is on the right and the shortest slot in the plate is on the left so that the push button 24 on the left must be depressed first in sequence to operate the control device 10.

As shown in FIG. 3 the compression spring 46 is positioned between the plate 42 and side 54 of the housing 22 opposite from the release button 52 for biasing the plate. As shown in FIG. 5 the spring 46 is positioned on the shaft 48 between the release button 52 and side 30 of the housing 22 for biasing the plate 42.

In operative use when a push button 24 is depressed some of the slack in internal cable 56 is taken up when pin 38 forces a short length of internal cable 56 to be deformed between pins 60 and thus shortens the effective length of internal cable as is shown in dots by numeral 58. Internal cable 56 is anchored at both ends 62 but is free to slide over pins 60. Each time cable 56 is shortened this in turn causes cable 16 to be drawn additional predetermined length into the housing 22 because pulley 64 is caused to slide to the right.

While certain novel features of this invention have been shown and described and are pointed out in the annexed claims, it will be understood that various omissions, substitutions and changes in the forms and details of the device illustrated and its operation can be made by those skilled in the art without departing from the spirit of the invention.

What is claimed is:

1. A shift control device for a bicycle having a control cable and gears, said device comprising:
   (a) a clamp member for attachment to said bicycle;
   (b) a housing mounted onto said clamp member;
   (c) a plurality of push buttons extending upwardly through the top of said housing;
   (d) means for locking each of said push buttons in a down position when each of said push buttons is depressed in sequence, to move the control cable extending outwardly through the side of said housing, a predetermined distance back into said housing to operate the gears; and
   (e) means for releasing said push buttons so that said push buttons and the control cable can return to a previous position.

2. A shift control device as recited in claim 1 wherein each of said push buttons includes:
   (a) a flat plunger having a side wedge shaped notch therein; and
   (b) a pin extending outwardly from side of said plunger below said notch to engage with the control cable.

3. A shift control device as recited in claim 2 wherein said locking means includes:
   (a) a plate having a plurality of slots therethrough in different lengths so that each of said plungers of said push buttons can extend through each of said slots wherein first of said slots being the longest in length; and
   (b) a spring for biasing said plate to move to one side so that each of said slots will enter each of said notches in each of said plungers of said push buttons when depressed in a proper sequence.

4. A shift control device as recited in claim 3 wherein said releasing means includes:
   (a) a shaft extending from one end of said plate and outwardly from side of said housing oppositely from said notches in said push buttons; and
   (b) a release button affixed to free end of said shaft to be depressed to overcome the bias of said spring so that said plate will move to the opposite side allowing said slots to leave said notches in said push buttons.

5. A shift control device as recited in claim 4 wherein said longest slot in said plate is on a first end and said shortest slot in said plate is on a second end so that said push button on the second end must be depressed first in sequence to operate said control device.

6. A shift control device as recited in claim 4 wherein said longest slot in said plate is a the second end and said shortest slot in said plate is on a first end so that said push button on the first end must be depressed first in sequence to operate said control device.

7. A shift control device as recited in claim 4 wherein said spring is positioned between said plate and side of said housing opposite from said release button for biasing said plate.

8. A shift control device as recited in claim 4 wherein said sping is positioned on said shaft between said release button and side of said housing for biasing said plate.

* * * * *